(12) United States Patent
Rahm et al.

(10) Patent No.: US 10,525,759 B2
(45) Date of Patent: Jan. 7, 2020

(54) VISUALLY VARIABLE SECURITY ELEMENT AND METHOD FOR PRODUCTION THEREOF

(75) Inventors: Michael Rahm, Hemau (DE); Marius Dichtl, Munich (DE); Manfred Heim, Munich (DE)

(73) Assignee: GIESECKE+DEVRIENT CURRENCY TECHNOLOGY GMBH.., Munich (DE)

( * ) Notice: Subject to any disclaimer, the term of this patent is extended or adjusted under 35 U.S.C. 154(b) by 891 days.

(21) Appl. No.: 12/097,668

(22) PCT Filed: Dec. 7, 2006

(86) PCT No.: PCT/EP2006/011769
§ 371 (c)(1),
(2), (4) Date: Jun. 16, 2008

(87) PCT Pub. No.: WO2007/079851
PCT Pub. Date: Jul. 19, 2007

(65) Prior Publication Data
US 2008/0258456 A1    Oct. 23, 2008

(30) Foreign Application Priority Data
Dec. 21, 2005   (DE) .................. 10 2005 061 749

(51) Int. Cl.
*B42D 25/324*   (2014.01)
*G07D 7/00*    (2016.01)
(Continued)

(52) U.S. Cl.
CPC ........... *B42D 25/324* (2014.10); *B42D 25/29* (2014.10); *B42D 25/328* (2014.10);
(Continued)

(58) Field of Classification Search
CPC .... B42D 15/00; B42D 15/10; B42D 15/0093; B42D 25/00; B42D 25/30; B42D 25/324;
(Continued)

(56) References Cited

U.S. PATENT DOCUMENTS 3,541,606 A   11/1970   Heenan et al.
4,184,700 A   1/1980    Greenaway
(Continued)

FOREIGN PATENT DOCUMENTS

AU   2003/224033 A1   10/2003
CH   689 680 A5       8/1999
(Continued)

OTHER PUBLICATIONS

Robert Lee, Micro mirror array nanostructures for anti-counterfeiting applications, 2004, Proc. of SPIE-IS&T Electronic Imaging, SPIE vol. 5310, pp. 350-368.*
(Continued)

*Primary Examiner* — Justin V Lewis
(74) *Attorney, Agent, or Firm* — Lathrop Gage LLP

(57) ABSTRACT

The invention relates to an optically variable security element (20) for securing valuable articles, having an achromatically reflective micropattern in the form of a mosaic (22) including a plurality of achromatically reflective mosaic elements (26-1, 26-2) that are characterized by the parameters size, contour shape, relief shape, reflectivity and spatial orientation and that form a predefined motif in that different groups of mosaic elements (26-1, 26-2) having different characteristic parameters reflect incident light (28) in different spatial regions (30). The mosaic elements (26-1, 26-2) exhibit a lateral dimension below the resolution limit of the eye.

35 Claims, 8 Drawing Sheets

Figure 1:
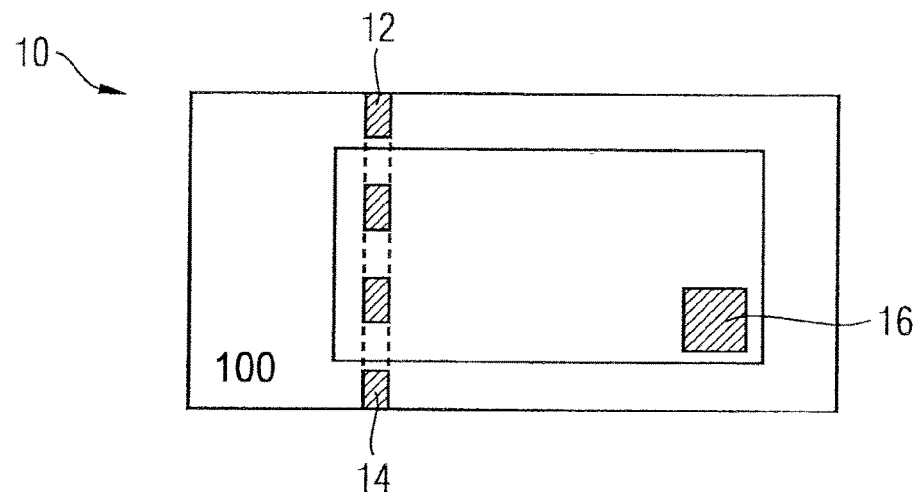

(51) Int. Cl.
  *B42D 25/364* (2014.01)
  *B42D 25/328* (2014.01)
  *B42D 25/29* (2014.01)
  *G02B 5/18* (2006.01)
  *B42D 25/21* (2014.01)

(52) U.S. Cl.
  CPC ......... *B42D 25/364* (2014.10); *G02B 5/1861* (2013.01); *G07D 7/003* (2017.05); *B42D 25/21* (2014.10); *B42D 2033/26* (2013.01); *B42D 2035/14* (2013.01)

(58) Field of Classification Search
  CPC .... B42D 25/36; B42D 2033/18; B42D 25/29; B42D 25/328; B42D 2035/14; B42D 2033/36; G07D 7/124; G02B 5/1861
  USPC ........ 283/61, 62, 72, 83, 85, 90, 91, 92, 94, 283/98, 107, 108, 109, 110, 111, 901; 99/61, 62, 72, 83, 85, 90, 91, 92, 94, 98, 99/107, 108, 109, 110, 111, 901
  See application file for complete search history.

(56) References Cited

U.S. PATENT DOCUMENTS

| | | | |
|---|---|---|---|
| 4,536,014 A * | 8/1985 | Boutaleb | G02F 1/1313 283/83 |
| 4,568,141 A | 2/1986 | Antes | |
| 4,588,258 A | 5/1986 | Hoopman | |
| 4,856,857 A | 8/1989 | Takeuchi et al. | |
| 4,984,824 A | 1/1991 | Antes et al. | |
| 5,032,003 A | 7/1991 | Antes | |
| 5,101,184 A | 3/1992 | Antes | |
| 5,122,902 A | 6/1992 | Benson | |
| 5,735,547 A * | 4/1998 | Morelle | G03G 21/043 283/67 |
| 5,784,200 A | 7/1998 | Modegi | |
| 5,808,758 A | 9/1998 | Solmsdorf | |
| 5,867,586 A * | 2/1999 | Liang | 283/92 |
| 5,936,770 A | 8/1999 | Nestegard et al. | |
| 6,060,143 A | 5/2000 | Tompkin et al. | |
| 6,157,487 A | 12/2000 | Staub et al. | |
| 6,210,777 B1 * | 4/2001 | Vermeulen et al. | 283/72 |
| 6,359,734 B1 | 3/2002 | Staub et al. | |
| 6,417,968 B1 | 7/2002 | Staub et al. | |
| 6,786,513 B1 * | 9/2004 | Cobben et al. | 283/72 |
| 6,890,634 B1 | 5/2005 | Yoon et al. | |
| 6,967,053 B1 | 11/2005 | Mullen et al. | |
| 6,974,218 B2 | 12/2005 | Schilling et al. | |
| 6,975,438 B2 | 12/2005 | Schilling et al. | |
| 7,002,746 B2 | 2/2006 | Schilling et al. | |
| 7,281,810 B2 * | 10/2007 | Lee | 283/85 |
| 7,405,879 B2 | 7/2008 | Wild et al. | |
| 7,594,680 B2 * | 9/2009 | Forde | 283/94 |
| 7,667,894 B2 | 2/2010 | Hoffmuller | |
| 2002/0163179 A1 * | 11/2002 | Dubner | B32B 27/36 283/72 |
| 2003/0025319 A1 * | 2/2003 | Patton et al. | 283/72 |
| 2003/0035191 A1 * | 2/2003 | Moia | 283/90 |
| 2003/0090804 A1 * | 5/2003 | Kotchick | 359/619 |
| 2003/0179364 A1 | 9/2003 | Steenblik et al. | |
| 2004/0136038 A1 * | 7/2004 | Holmes et al. | 359/15 |
| 2004/0169928 A1 * | 9/2004 | Nilsen et al. | 359/529 |
| 2005/0068625 A1 | 3/2005 | Schilling et al. | |
| 2005/0127663 A1 | 6/2005 | Heim | |
| 2005/0168723 A1 | 8/2005 | Schilling et al. | |
| 2006/0056065 A1 | 3/2006 | Schilling et al. | |
| 2006/0072225 A1 | 4/2006 | Schilling et al. | |
| 2006/0181077 A1 | 8/2006 | Kaule et al. | |
| 2006/0251863 A1 | 11/2006 | Katschorek et al. | |
| 2006/0256411 A1 | 11/2006 | Denjean et al. | |
| 2007/0165182 A1 | 7/2007 | Hoffmuller | |
| 2007/0211238 A1 | 9/2007 | Hoffmuller | |
| 2007/0216518 A1 | 9/2007 | Hoffmuller | |
| 2007/0241551 A1 | 10/2007 | Heim | |
| 2007/0246933 A1 | 10/2007 | Heim | |
| 2007/0274559 A1 | 11/2007 | Depta | |
| 2008/0014378 A1 | 1/2008 | Hoffmuller | |
| 2008/0054621 A1 | 3/2008 | Burchard | |
| 2008/0079257 A1 | 4/2008 | Fessl | |
| 2008/0088859 A1 | 4/2008 | Depta | |
| 2008/0160226 A1 | 7/2008 | Kaule | |
| 2008/0163994 A1 | 7/2008 | Hoppe | |
| 2008/0198468 A1 | 8/2008 | Kaule | |
| 2008/0216976 A1 | 9/2008 | Ruck | |
| 2008/0250954 A1 | 10/2008 | Depta | |
| 2008/0258456 A1 | 10/2008 | Rahm | |
| 2008/0259456 A1 | 10/2008 | Schilling et al. | |
| 2009/0001709 A1 | 1/2009 | Kretschmar | |
| 2009/0008923 A1 | 1/2009 | Kaule | |
| 2009/0008926 A1 | 1/2009 | Depta | |
| 2009/0102605 A1 | 4/2009 | Kaule | |
| 2009/0115185 A1 | 5/2009 | Hoffmuller | |
| 2009/0236061 A1 | 9/2009 | Gruszczynski | |
| 2009/0297805 A1 | 12/2009 | Dichtl | |
| 2009/0322071 A1 | 12/2009 | Dichtl | |

FOREIGN PATENT DOCUMENTS

| | | | |
|---|---|---|---|
| CH | 691 750 A5 | 9/2001 | |
| DE | 2555214 A1 | 6/1977 | |
| DE | 4421407 C1 | 6/1995 | |
| DE | 29700289 U1 | 6/1997 | |
| DE | 19635752 A1 | 3/1998 | |
| DE | 10100836 A1 | 7/2002 | |
| DE | 10129939 A1 | 1/2003 | |
| DE | 10216561 A1 | 10/2003 | |
| DE | 10216563 A1 | 10/2003 | |
| DE | 10232245 A1 | 2/2004 | |
| DE | 10312708 A1 | 10/2004 | |
| DE | 10254500 B4 | 3/2006 | |
| EP | 0 105 099 A1 | 4/1984 | |
| EP | 0 330 738 A1 | 9/1989 | |
| EP | 0330733 A1 | 9/1989 | |
| EP | 0375833 A1 | 7/1990 | |
| EP | 0360969 B1 | 12/1993 | |
| EP | 0723246 A2 | 7/1996 | |
| EP | 0 883 085 A1 | 12/1998 | |
| EP | 1093414 | 4/2001 | |
| EP | 0064067 B2 | 3/2002 | |
| EP | 1417517 | 5/2004 | |
| EP | 1711347 | 10/2006 | |
| GB | 000237784 A * | 8/1925 | |
| GB | 237784 A * | 8/1925 | ............... B44C 1/26 |
| GB | 2207273 A * | 1/1989 | ............. G09F 13/16 |
| WO | WO 1991/003747 A1 | 3/1991 | |
| WO | WO 1995/004948 A1 | 2/1995 | |
| WO | WO 1997/019821 A1 | 6/1997 | |
| WO | WO 98/20382 A1 | 5/1998 | |
| WO | WO 98/53999 A1 | 12/1998 | |
| WO | WO 99/38038 A1 | 7/1999 | |
| WO | WO 1999/047983 A1 | 9/1999 | |
| WO | WO 1999/059036 A1 | 11/1999 | |
| WO | WO 9959036 A1 * | 11/1999 | ............. G03H 1/265 |
| WO | WO 00/13916 A1 | 3/2000 | |
| WO | WO 2001/003945 A1 | 1/2001 | |
| WO | WO 02/06858 A2 | 1/2002 | |
| WO | WO 2002/000445 A1 | 1/2002 | |
| WO | WO 02/48760 A1 | 6/2002 | |
| WO | WO 02/091041 A1 | 11/2002 | |
| WO | WO 02091041 A1 * | 11/2002 | ............... B44F 1/10 |
| WO | WO 03/000503 A1 | 1/2003 | |
| WO | WO 2003/020834 | 3/2003 | |
| WO | WO 2003/055691 A1 | 7/2003 | |
| WO | WO 2003/068525 A1 | 8/2003 | |
| WO | WO 03/084765 A2 | 10/2003 | |
| WO | WO 03/084766 A2 | 10/2003 | |
| WO | WO 2003/095657 A2 | 11/2003 | |
| WO | WO 04/023200 A1 | 3/2004 | |
| WO | WO 2004/049250 A1 | 6/2004 | |
| WO | WO 2004/082959 | 9/2004 | |
| WO | WO 2004/095090 A1 | 11/2004 | |
| WO | WO 2005/002873 A1 | 1/2005 | |

(56) References Cited

FOREIGN PATENT DOCUMENTS

| | | |
|---|---|---|
| WO | WO 2005/009751 A2 | 2/2005 |
| WO | WO 05/038500 A1 | 4/2005 |
| WO | WO 2005/052650 A2 | 6/2005 |
| WO | WO 05/101101 A2 | 10/2005 |
| WO | WO 05105473 | 11/2005 |
| WO | WO 05105474 | 11/2005 |
| WO | WO 05105475 | 11/2005 |
| WO | WO 05108106 | 11/2005 |
| WO | WO 05108108 | 11/2005 |
| WO | WO 05108110 | 11/2005 |
| WO | WO 06005434 | 1/2006 |
| WO | WO 06015733 | 2/2006 |
| WO | WO 06018171 | 2/2006 |
| WO | WO 06018172 | 2/2006 |
| WO | WO 06040069 | 4/2006 |
| WO | WO 06056342 | 6/2006 |
| WO | WO 06072380 | 7/2006 |
| WO | WO 06087138 | 8/2006 |
| WO | WO 2006/095161 A2 | 9/2006 |
| WO | WO 06099971 | 9/2006 |
| WO | WO 06119896 | 11/2006 |
| WO | WO 2006/133863 A2 | 12/2006 |
| WO | WO 06128607 | 12/2006 |
| WO | WO 07006445 | 1/2007 |
| WO | WO 07006455 | 1/2007 |
| WO | WO 07076952 | 7/2007 |
| WO | WO 07079851 | 7/2007 |
| WO | WO 07115648 | 10/2007 |
| WO | WO 08/000350 | 1/2008 |
| WO | WO 08/000351 | 1/2008 |
| WO | WO 08/049533 | 5/2008 |
| WO | WO 08/061636 | 5/2008 |
| WO | WO 08/071325 | 6/2008 |
| WO | WO 09/000527 | 12/2008 |
| WO | WO 09/000528 | 12/2008 |
| WO | WO 09/000529 | 12/2008 |
| WO | WO 09/000530 | 12/2008 |
| WO | WO 09/012893 | 1/2009 |
| WO | WO 09/024265 | 2/2009 |

OTHER PUBLICATIONS

Reobert Lee, Micro mirror array nanostructures for anti-counterfeiting applications, 2004, Proc. of SPIE-IS&T Electronic Imaging, SPIE vol. 5310, pp. 350-368.*
Robert Lee, Micro mirror array nanostructures for anti-counterfieting applications, 2004, Proc. of SPIE-IS&T Electronic Imaging. SPIE vol. 5310, pp. 350-368.*
Patrick W. Leech, et al. Optically variable micro-mirror arrays fabricated by graytone lithography, Oct. 25, 2005, Science Direct, Microelectronic Engineering, vol. 83, pp. 351-356.*
Optically variable micro-mirror arrays fabricated by graytone lithography (available online Oct. 25, 2005) by Patrick W. Leech et al.*
Micro mirror array nanostructures for anti-counterfeiting applications (copyright date 2004) to Robert Lee.*
"Optically variable micro-mirror arrays fabricated by graytone lithography" (available online Oct. 25, 2005) by Patrick W. Leech et al. ("Leech").*
U.S. Appl. No. 11/568,302, filed Oct. 25, 2006, Hoffmuller, 2007-0216518, WO 2005/105474.
U.S. Appl. No. 11/568,386, filed Oct. 26, 2006, Hoffmuller, 2007-0229928, WO 2005/105473.
U.S. Appl. No. 11/568,388, filed Oct. 26, 2006, Hoffmuller, 2007-0211238, WO 2005/108108.
U.S. Appl. No. 11/568,390, filed Oct. 26, 2006, Hoffmuller, 2007-0165182, WO 2005/105475.
U.S. Appl. No. 11/568,535, filed Nov. 12, 2007, Depta, 2008-0088859, WO 2005108106.
U.S. Appl. No. 11/568,538, filed Sep. 23, 2008, Depta, 2009-0008926, WO 2005/108110.
U.S. Appl. No. 11/571,923, filed Jan. 10, 2007, Hoffmuller, 2008-0014378, WO 2006/005434.
U.S. Appl. No. 11/573,060, filed Feb. 1, 2007, Depta, 2007-0274559, WO 2006/015733.
U.S. Appl. No. 11/573,484, filed Feb. 9, 2007, Heim, 2007-0246933, WO 2006/018171.
U.S. Appl. No. 11/573,506, filed Feb. 9, 2007, Burchard, 2008-0054621, WO 2006/018172.
U.S. Appl. No. 11/576,583, filed Apr. 3, 2007, Heim, 2007-0241551, WO 2006040069.
U.S. Appl. No. 11/719,843, filed Apr. 3, 2008, Kaule, 2009-0102605, WO 2006/056342.
U.S. Appl. No. 11/813,077, filed Jun. 28, 2007, Hoppe, 2008-0163994, WO 2006/072380.
U.S. Appl. No. 11/779,707, filed Jul. 18, 2007, Fessl, 2008-0079257.
U.S. Appl. No. 11/816,514, filed Aug. 16, 2007, Kaule, 2008-0160226, WO 2006/087138.
U.S. Appl. No. 11/909,115, filed Sep. 19, 2007, Kretschmar, 2009-0001709, WO 2006/099971.
U.S. Appl. No. 11/913,658, filed May 14, 2008, Ruck, 2008-0216976, WO 2006/119896.
U.S. Appl. No. 11/915,965, filed Nov. 29, 2007, Depta, 2008-0250954, WO 2006/128607.
U.S. Appl. No. 11/995,227, filed Jan. 10, 2008, Gruszczynski, 2009-0236061, WO 2007/006445.
U.S. Appl. No. 11/995,228, filed Jan. 10, 2008, Kaule, 2008-0198468, WO 2007/006455.
U.S. Appl. No. 12/097,668, filed Jun. 16, 2008, Rahm, 2008-0258456, WO 2007/079851.
U.S. Appl. No. 12/097,834, filed Jun. 17, 2008, Kaule, 2009-0008923, WO 2007/076952.
U.S. Appl. No. 12/294,222, filed Sep. 23, 2008, Hoffmuller, 2009-0115185, WO 2007/115648.
U.S. Appl. No. 12/304,498, filed Dec. 12, 2008, Dichtl, 2009-0297805, WO 2008/000350.
U.S. Appl. No. 12/304,522, filed Dec. 12, 2008, Dichtl, 2009-0322071, WO 2008/000351.
U.S. Appl. No. 12/446,494, in pre-exam, Heim, WO 2008/049533.
U.S. Appl. No. 12/515,923, in pre-exam, Heim, WO 2008/061636.
U.S. Appl. No. 12/517,848, in pre-exam, Gregarek, WO 2008/071325.
U.S. Appl. No. 12/665,072, in pre-exam, Kaule, WO 2009/000529.
U.S. Appl. No. 12/665,078, in pre-exam, Kaule, WO 2009/000528.
U.S. Appl. No. 12/665,834, in pre-exam, Kaule, WO 2009/000530.
U.S. Appl. No. 12/665,843, in pre-exam, Kaule, WO 2009/000527.
U.S. Appl. No. 12/669,838, in pre-exam, Keller, WO 2009/012893.
U.S. Appl. No. 12/673,805, in pre-exam, Dichtl, WO 2009/012893.
International Search Report, International Application No. PCT/EP2006/011769, 4 pages, dated Mar. 20, 2007.
International Preliminary Report on Patentability, International Application No. PCT/EP2006/011769, 9 pages, dated Dec. 12, 2007, English Translation.
Lee, R., "Micro mirror array nanostructures for anti-counterfeiting applications," Proc. SPIE-IS&T Electronic Imaging 5310:350-368, 2004.
Leech, P.W. et al., "Optically variable micro-mirror arrays fabricated by graytone lithography," Microelectronic Engineering 83(2):351-356, Feb. 2006.
German Search Report, German Application No. 102005061749.2, dated Nov. 17, 2006, 4 pages.
European Office Action, European Patent Application No. 06 829 388.5, dated Aug. 10, 2012, 3 pages.
R. A. Lee, "Colourtone lithography," Microelectronic Engineering 61-62:105-111, 2002.
Third Party Observation corresponding to European Patent Application No. 06829388.5, dated Nov. 14, 2014.
M.C. Escher Foundation "M.C. Escher, Most Popular," http://www.mcescher.com/gallery/most-popular/ [Last Accessed Jan. 28, 2015].
Van Renesse, Rudolf L.: Ed. (1998) *Optical Document Security*. $2^{nd}$ Edition, Artech House, pp. 227-229.
Communication of a notice of opposition; in European Patent Application No. 06829388.5, dated Aug. 13, 2015.

(56) References Cited

OTHER PUBLICATIONS

Written submission in preparation to/during oral proceedings dated May 26, 2017 in opposition proceeding for European Patent Application No. 06829388.5.

* cited by examiner ent claims. Developments of the present invention are the subject of the dependent claims.

VISUALLY VARIABLE SECURITY ELEMENT AND METHOD FOR PRODUCTION THEREOF

CROSS-REFERENCE TO RELATED APPLICATIONS

This application is the U. S. National Stage of International Application No. PCT/EP2006/011769, filed Dec. 7, 2006, which claims the benefit of German Patent Application DE 10 2005 061 749.2, filed Dec. 21, 2005; both of which are hereby incorporated by reference to the extent not inconsistent with the disclosure herewith.

The present invention relates to an optically variable security element for securing valuable articles, a method for manufacturing such a security element and a data carrier equipped with such a security element.

For protection, data carriers, such as value or identification documents, or also other valuable articles, such as branded articles, are often provided with security elements that permit the authenticity of the data carrier to be verified, and that simultaneously serve as protection against unauthorized reproduction. The security elements can be developed, for example, in the form of a security thread embedded in a banknote, a tear strip for product packaging, an applied security strip, a cover foil for a banknote having a window, or a self-supporting transfer element, such as a patch or a label that, after its manufacture, is applied to a value document.

To prevent reproduction of the security elements even with top-quality color copiers, they exhibit multiply optically variable elements that, from different viewing angles, convey to the viewer a different image impression and show, for example, a different color impression or different graphic motifs. For this purpose, the security elements are furnished, for example, with security features in the form of micro- or nanopatterns having a diffraction optical effect, such as with conventional embossed holograms or other hologram-like diffraction patterns. Such diffraction optical patterns for security elements are described, for instance, in the publications EP 0 330 733 A1 and EP 0 064 067 A1.

The optical efficiency of holograms and hologram-like diffraction patterns is based, not least, on the color split upon the incidence of polychromatic light on the diffraction pattern. In recent years, however, the resulting play of colors has become so common that its value as an attractive security feature is already significantly decreasing. In many cases, the characteristic visual effect is no longer perceived by viewers as a security feature, but rather merely as a design variant, reducing the benefit of these security features for the counterfeit protection. Furthermore, the diffraction-optically produced image or color impressions can often be perceived completely and sharply only from certain viewing directions and under good lighting conditions. Particularly under poor lighting conditions, such as under diffuse illumination, the perceptibility of holographic motifs is often greatly restricted.

Based on that, the object of the present invention is to specify a security element of the kind cited above having high counterfeit security and that avoids the disadvantages of the background art. In particular, it is intended to create a security element whose optically variable effects are still easily perceptible even under adverse illumination conditions.

This object is solved by the security element and the manufacturing method having the features of the independent claims. Developments of the present invention are the subject of the dependent claims.

According to the present invention, a generic optically variable security element includes an achromatically reflective micropattern in the form of a mosaic comprising a plurality of achromatically reflective mosaic elements that are characterized by the parameters size, contour shape, relief shape, reflectivity and spatial orientation. The mosaic elements form a predefined motif in that different groups of mosaic elements having different characteristic parameters reflect incident light in different spatial regions. Furthermore, the mosaic elements exhibit a lateral dimension below the resolution limit of the eye.

The mosaic elements preferably even exhibit a lateral dimension of less than 30 µm. Due to the low profile depth associated with the small size, for one thing, it is possible to manufacture such small mosaic elements in established foil technology, and for another, the small element size creates a number of possible arrangements for the mosaic elements, as described in greater detail below together with the respective associated advantages.

The mosaic elements advantageously exhibit a lateral dimension of more than 3 µm, preferably of more than 10 µm. Through these dimensions, it is ensured that wavelength-dependent light diffraction effects are negligible and that the incident light is achromatically reflected by the mosaic elements without interfering color effects.

The mosaic elements expediently exhibit a quadratic, rectangular, round, oval, honeycomb or polygonally delimited contour shape. The lateral dimensions of the mosaic elements in any direction are advantageously not more than five times the dimension in one of the other directions.

Especially opaque metal layers, transparent and high-index layers in which the color, a graphic motif or another piece of information of the background remains perceptible may be used as reflection layers for the mosaic elements. Furthermore, also more complex structures, such as thin-layer elements having a color-shift effect or layers composed of liquid crystal material, especially composed of cholesteric liquid crystal material, may be used. With the aid of matte patterns or moth-eye patterns, the reflectivity of the mosaic elements can be precisely set to a desired value between 0 and a predefined maximum value.

In an advantageous variant of the present invention, the mosaic elements exhibit a simple relief shape having exactly one reflection area tilted against the surface of the security element. Here, the tilt angle of the reflection area of the mosaic elements expediently measures less than 90°, preferably less than about 45°. The reflection area of the mosaic elements can be flat or also concavely or convexly curved.

In other likewise advantageous variants of the present invention, the mosaic elements exhibit relief shapes having two or more reflection areas that are tilted in different directions against the surface of the security element. In particular, the mosaic elements can exhibit a roof structure or a multilateral pyramidal structure. In this variant, too, the tilt angle of the reflection areas of the mosaic elements expediently measures less than 90°, preferably less than about 45°, and the reflection areas of the mosaic elements can be either flat or concavely or convexly curved.

According to a further advantageous variant of the present invention, mosaic elements form retroreflectors, in other words multiply reflective structures that, from a certain angular range, reflect incident light back in the direction of incidence. Here, in particular, the mosaic elements exhibit a cube-corner pattern having a relief shape composed of three substantially reflection areas that stand substantially vertically on top of one another and facing one another. The three reflection areas define an optical axis that, for a cube-corner pattern, is given by the spatial diagonal of the associated cube. The optical axis defined in this way preferably points in a prechosen direction for each mosaic element, such that one or more image motifs can be depicted, as described in greater detail below.

The mosaic itself is preferably a raster image composed of a plurality of pixels, each pixel being formed by one or more achromatically reflective mosaic elements. Here, the brightness of the pixels of the raster image can be determined by one or more of the parameters size, contour shape, relief shape, reflectivity and spatial orientation of the mosaic elements of the respective pixel, or also by the number of mosaic elements having certain characteristic parameters in the respective pixel.

In a further development of the security element according to the present invention, a further piece of information is encoded in the arrangement of the mosaic elements within a pixel.

According to the present invention, the mosaic of the security element can also reflect two or more different image motifs in different spatial regions such that a tilt or motion image is created for the viewer upon appropriate movement of the security element. In another embodiment, the mosaic can also reflect a growing or shrinking contour line of an image motif in different spatial regions such that a pump image is created for the viewer upon appropriate movement of the security element. If the mosaic reflects at least two views of an image motif in different spatial regions, then a stereo image of the image motif is created for the viewer at a prechosen viewing distance.

In all of the described embodiments, the parameters size, contour shape, relief shape, reflectivity and spatial orientation of the mosaic elements can be chosen such that one or all of the motif images are visible for the viewer upon a level orientation of the security element. Alternatively or additionally, these parameters can also be chosen such that one or all of the motif images appear for the viewer only upon a prechosen deformation of the security element.

In addition to the embodiments in which the viewer views the security element itself, embodiments may also be used in which the parameters size, contour shape, relief shape, reflectivity and spatial orientation of the mosaic elements are chosen such that, upon prechosen illumination, the security element projects one or all of the motif images onto a collecting surface of a prechosen geometry.

The security elements according to the present invention can be combined with further security features. For example, a security element can additionally exhibit pieces of information in the form of patterns, characters or codes that are formed by non-reflective regions within the mosaic. Also the achromatically reflective micropatterns can be combined with holographic or hologram-like diffraction patterns, or provided with incorporated magnetic substances, with incorporated phosphorescent, fluorescent or other luminescent substances, with specifically adjusted conductivity, especially through a specifically adjusted thickness of a metallic reflection layer, with color-shift effects or colored embossing lacquer and the like.

The present invention also includes a method for manufacturing a security element of the kind described, in which the surface profile of the micropattern is embossed in a lacquer layer, and the embossed lacquer layer is coated with a reflection layer. Here, the surface profile is preferably embossed in a UV-curing lacquer layer and the lacquer layer cured after embossing. To prevent a casting and undesired replication of the surface profile, the reflection layer is preferably covered by a transparent coating layer, for example a UV lacquer layer. This covering can be done, for example, by the embossing lacquer layer itself.

In principle, the inventive surface profile of the micropattern can be introduced into all known materials that are accessible to the embossing method. Thus, in addition to the already mentioned and preferred UV-curing lacquers, also e.g. thermoplastic embossing lacquers can be used. As thermoplastic embossing lacquers, e.g. thermoplastic plastic materials may be used in which the surface profile according to the present invention is imprinted by means of a suitable embossing die under the influence of heat. For example, thermoplastic plastics that are provided with the micropattern according to the present invention by means of a nickel matrix as the embossing die at a temperature of approximately 130° C. are very common.

The present invention also comprises a data carrier, especially a value document, such as a banknote, an identification card or the like, that is furnished with a security element of the kind described.

Further exemplary embodiments and advantages of the present invention are described below with reference to the drawings. To improve clarity, a depiction to scale and proportion was dispensed with in the drawings.

Figure 2:
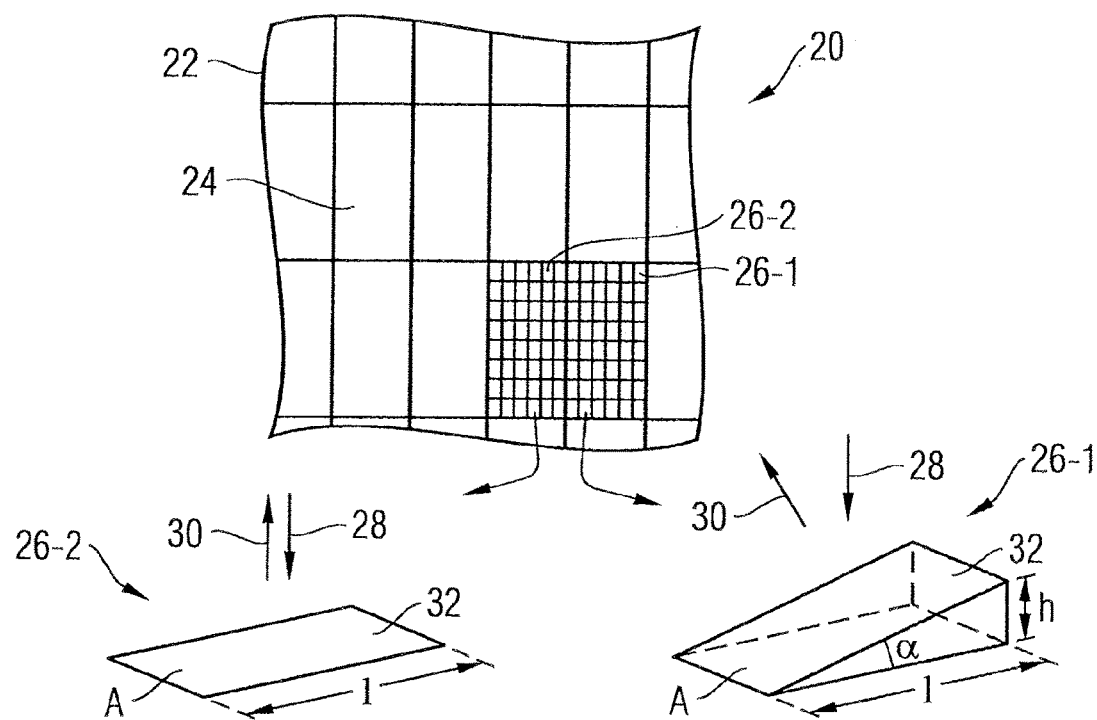
Figure 3:
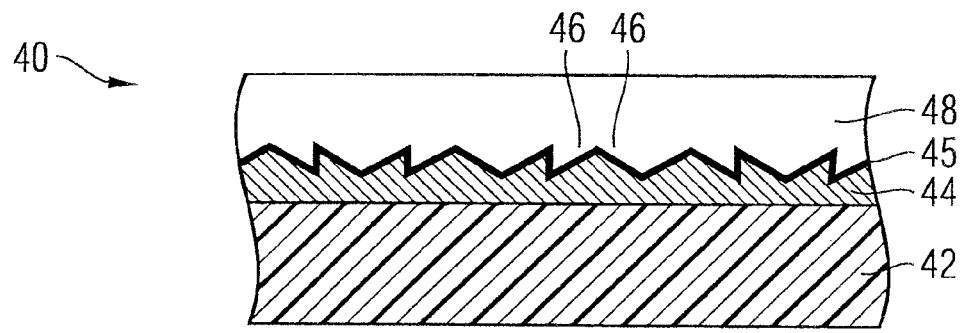
Figure 4:
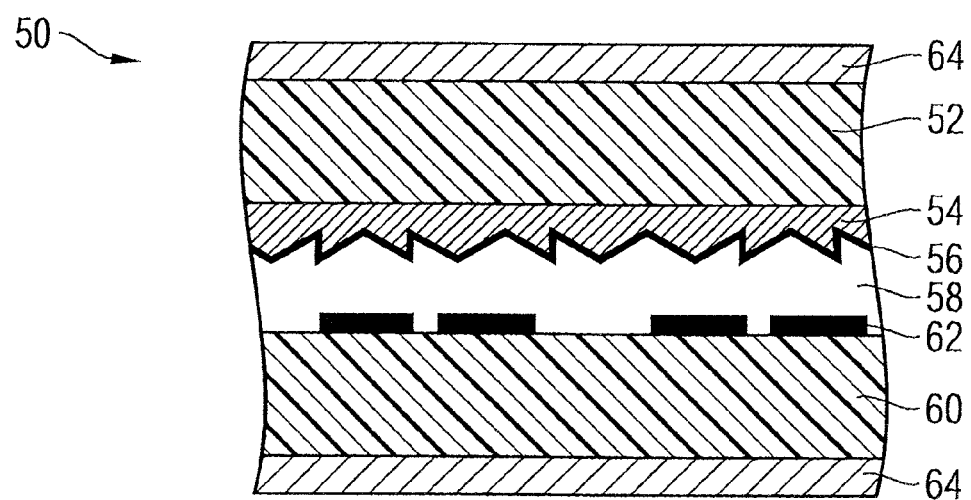
Figure 5A:
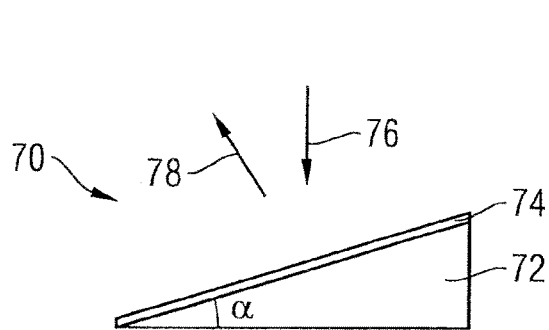
Figure 5B:
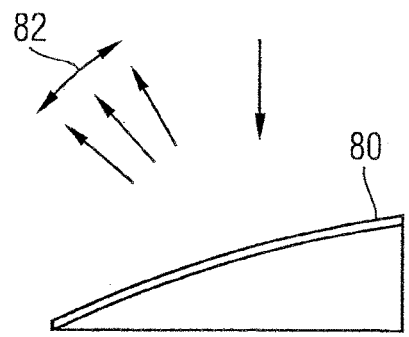
Figure 5C:
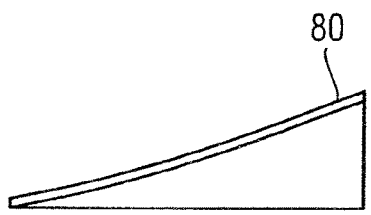
Figure 5D:
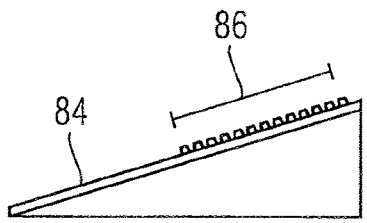
Figure 5E:
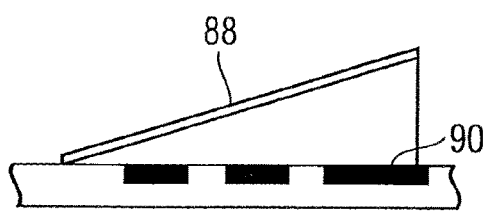
Figure 5F:
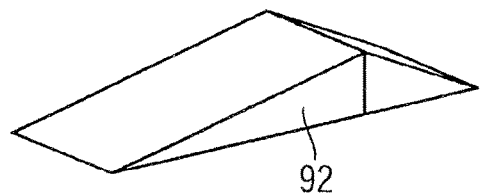
Figure 5G:
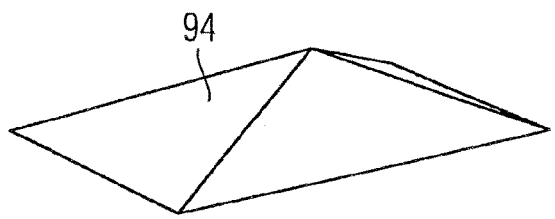
Figure 6A:
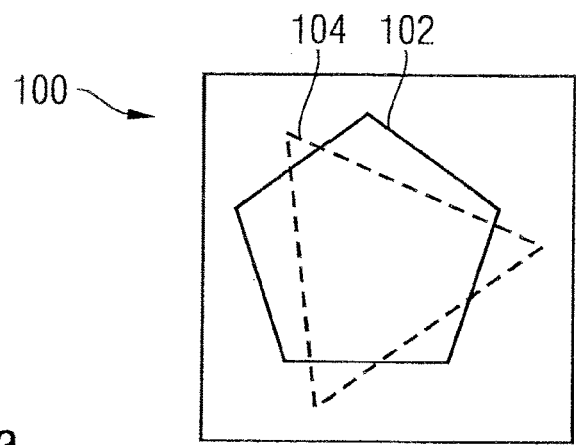
Figure 6B:
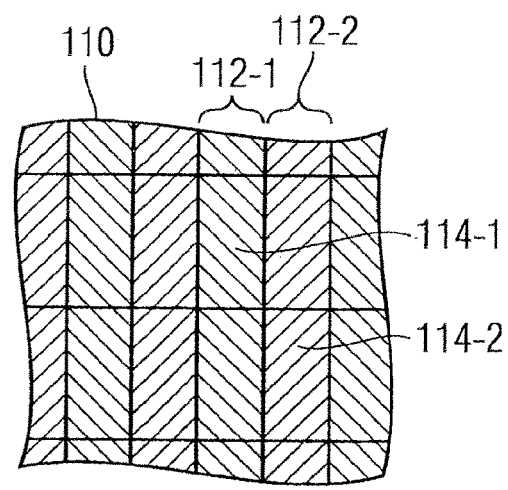
Figure 6C:
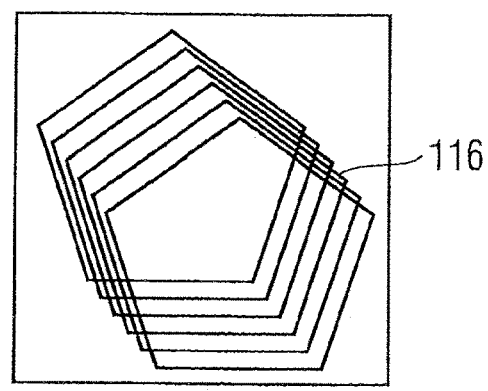
Figure 7:
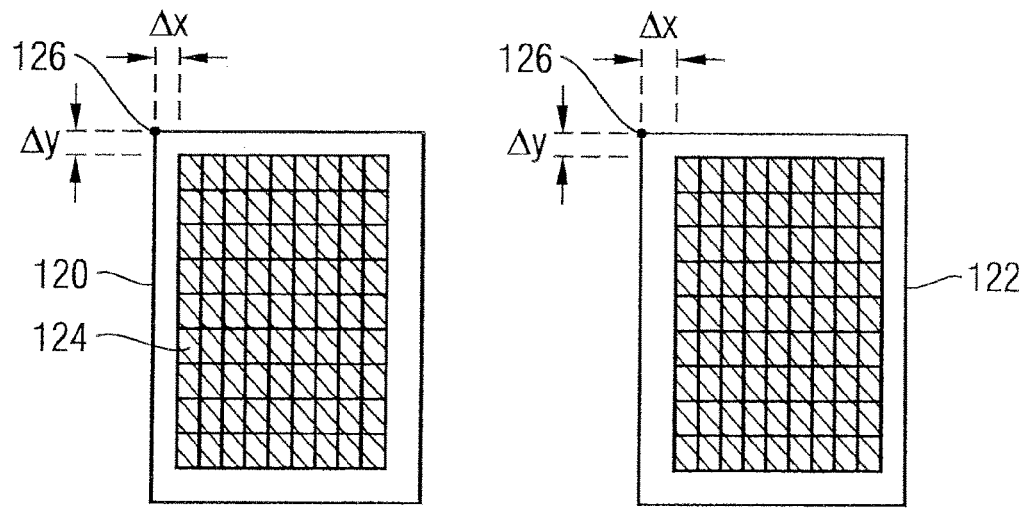
Figure 8:
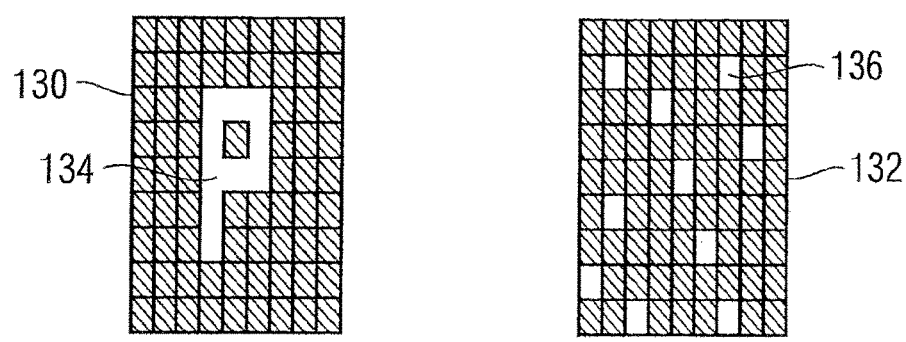
Figure 9:
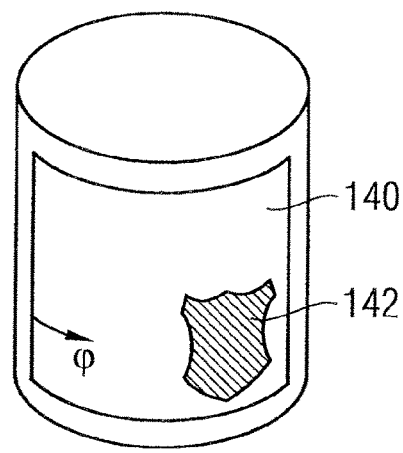
Figures 10A, 10B, 10C:
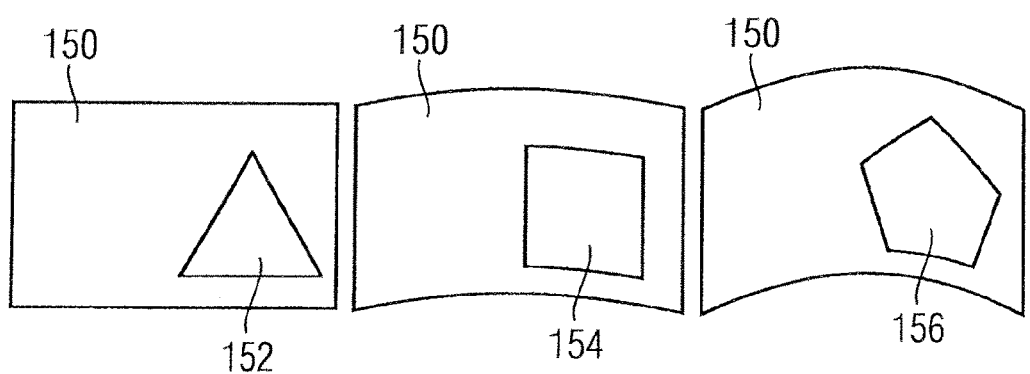
Figure 11:
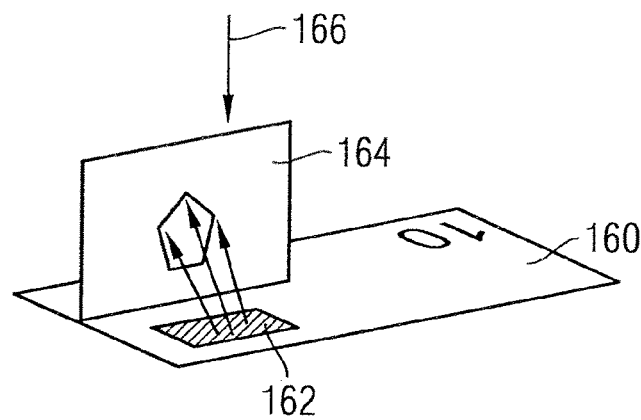
Figure 12:
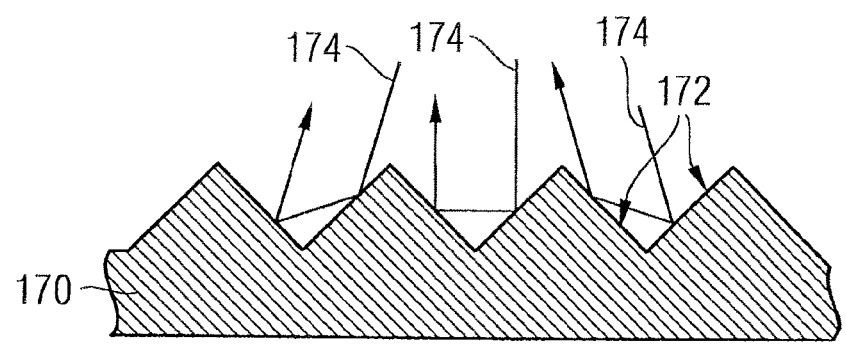
Figure 13:
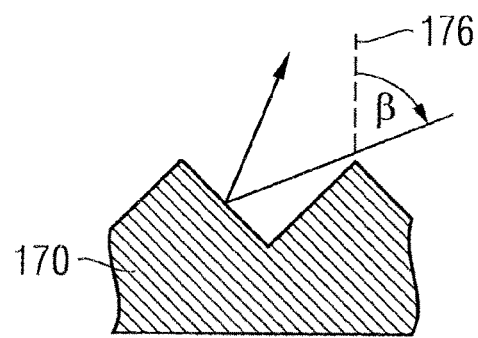
Figure 14:
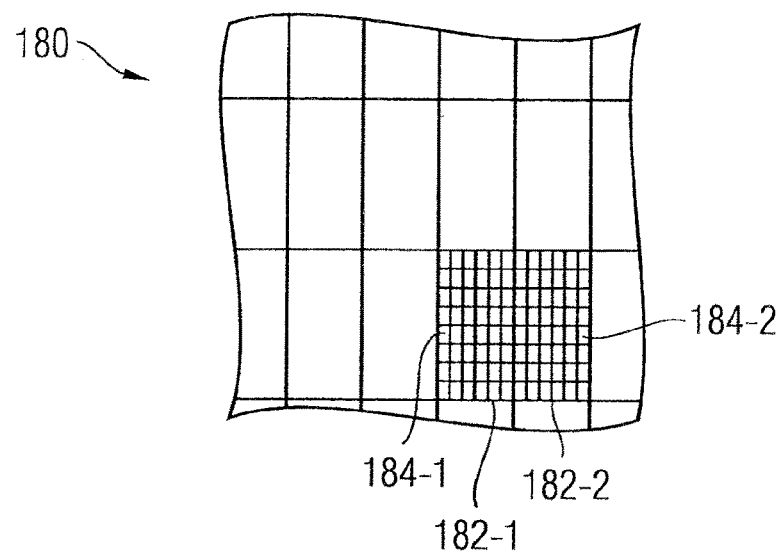
Figure 15:
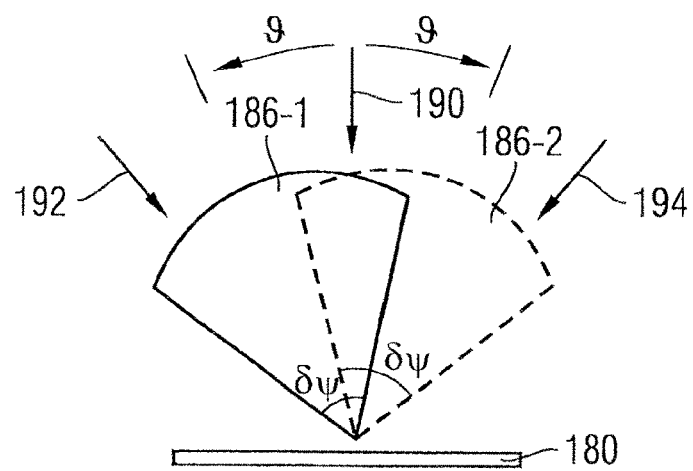

Shown are:

FIG. 1 a schematic diagram of a banknote having an embedded security thread and an affixed transfer element, FIG. 2 a schematic diagram to exemplify the principle of security elements according to the present invention, FIG. 3 the layer structure of a security foil according to the present invention prior to its application on a substrate, FIG. 4 the layer structure of a security thread according to the present invention, in cross section, FIG. 5 in (a) to (g), different embodiments of micromirrors according to the present invention, FIG. 6 in (a), a security element having two image motifs that are visible from different viewing directions, in (b), the associated division of the image area into sub-areas, and in (c), a security element having a motion image, FIGS. 7, 8 security elements having further pieces of information encoded in the arrangement of the micromirrors according to exemplary embodiments of the present invention, FIG. 9 a security element according to the present invention in the form of a label, FIG. 10 a flexible document having an optically variable security element having a "curve flip effect" according to a further exemplary embodiment of the present invention, FIG. 11 a banknote having an inventive security element that, upon suitable illumination, projects a desired image motif onto a collection screen, FIG. 12 a cross section through an achromatically reflective micropattern whose mosaic elements are formed by retroreflectors, FIG. 13 a schematic diagram to exemplify the limit of the retroreflection effect, FIG. 14 a security element having cube-corner elements according to a further exemplary embodiment of the present invention, and FIG. 15 the geometric relationships when the security element in FIG. 14 is viewed.

The invention will now be explained using a banknote as an example. For this, FIG. 1 shows a schematic diagram of a banknote 10 that is furnished with two security elements 12 and 16 having achromatically reflective micropatterns, each according to an exemplary embodiment of the present invention. Here, the first security element constitutes a security thread 12 that emerges at certain window areas 14 on the surface of the banknote 10, while it is embedded in the interior of the banknote 10 in the areas lying therebetween. The second security element is formed by an affixed transfer element 16 of any shape.

The principle of security elements according to the present invention will now be explained with reference to the schematic diagram in FIG. 2. The security element 20 includes a raster image 22 composed of a plurality of pixels 24, each pixel 24 including a plurality of achromatically reflective micromirrors 26-1, 26-2, as indicated for two of the pixels 24 in FIG. 2. The micromirrors are characterized by the parameters size, contour shape, relief shape, reflectivity and spatial orientation and each reflects incident light 28 in accordance with the specifications of this set of parameters in a certain spatial region 30.

For example, the micromirrors 26-1 and 26-2 in FIG. 2 each exhibit a quadratic base area A, thus a quadratic contour shape, and a lateral expanse of 15×15 µm². Furthermore, the micromirrors have a simple relief shape having a single, flat reflection area 32 that encloses a certain tilt angle α with the surface of the security element.

Here, in first pixels are present micromirrors 26-1 of a first kind in which the reflection area 32 exhibits a tilt angle of α=30° to the surface of the security element. Given a lateral expanse of l=15 µm, at this tilt angle, a pattern height h of h=l*tan(α)=8.7 µm results for the micromirrors 26-1. In second pixels, micromirrors 26-2 of a second kind are present whose reflection area 32 is not tilted against the surface of the security element (expressed by tilt angle α=0°).

If the security element 20 is now viewed from the spatial direction in which the first micromirrors 26-1 reflect, then the pixels having the first micromirrors 26-1 appear light, the pixels having the second micromirrors 26-2, on the other hand, dark, such that a "black-and-white" raster image having the desired image content is created in accordance with the arrangement of the pixels 24.

For the chosen dimensions of the micromirrors 26-1, 26-2, on the one hand, it is ensured that the micromirrors are so small that they cannot be resolved by the naked eye, that each pixel 24 thus appears as a uniform area for the viewer. On the other hand, the micromirrors are so large that wavelength-dependent light diffraction effects are negligible. The incident light is thus achromatically reflected by the micromirrors 26-1, 26-2 without interfering color effects.

In the simplest case, the pixels of the raster images are each filled with homogeneous micromirrors. For example, the screen dots can each exhibit a size of 100 µm×100 µm and include 100 micromirrors having a base area of 10 µm×10 µm. "Dark" pixels can also be achieved by a random orientation of the individual micromirrors in this pixel, since in this way, less light is directed into the spatial directions preferred by other pixels.

The manufacture of security elements having surface profiles that include such micromirrors places high demands on the production process. For exemplification, FIG. 3 shows the layer structure of an inventive security foil 40 having an achromatically reflective micromirror pattern prior to its application on a substrate.

To manufacture the security foil 40, a light-sensitive UV lacquer layer 44 is applied homogeneously to a substrate foil 42 and embossed in the form of the desired surface relief. Thereafter, the embossed lacquer layer is cured by irradiation with UV light and a light-reflective metal layer 45 is applied, for example a 40 nm thick aluminum layer. Insofar as a thermoplastic material is used instead of the UV lacquer layer 44, the surface relief is cast in the thermoplast at an elevated temperature, e.g. 130° C., and the thermoplastic material provided with the light-reflective metal layer 45 after curing.

The finished pattern is then applied via an adhesive layer 48 to a substrate that is not depicted in FIG. 3, and the substrate foil 42 is subsequently removed. The specular metal layer 45 is then covered by the UV lacquer 44, which serves to protect the embossed surface pattern against casting and undesired replication. Furthermore, the higher refractive index of the lacquer layer compared with the ambient air results in the tilt angle α required for a certain deflection of the incident light being able to be chosen to be smaller than for uncovered mirror areas. Thus, also the profile height h can be chosen to be smaller, which eases the manufacturing process.

As can be seen in FIG. 3, the surface relief shown there includes two kinds of micromirrors 46 having the same tilt angle α, but different spatial orientations. When the security element is viewed vertically, and when illuminated suitably, both micromirror types appear, for example, equally bright. If the viewer tilts the security element to the right or left, then the image motif formed by the micromirrors 46 stands out once as a positive image and once as a negative image.

The exemplary embodiment in FIG. 4 shows the layer structure of a security thread 50 having an achromatically reflective micromirror pattern. To manufacture the security thread 50, a UV lacquer layer 54 is applied to a PET foil 52, embossed in the form of the desired surface relief, cured, and provided with a reflective metal layer 56. The layer structure obtained in this way is then laminated by means of a laminating adhesive 58 onto to a second PET foil 60 that is furnished with a machine-readable security feature in the form of magnetic strips 62. Finally, the security thread is coated on both sides with heat seal coating 64.

According to the present invention, the micromirrors can be formed in a plurality of embodiments to reflect the incident light to differing extents in different spatial regions, as shown with reference to FIG. 5.

The micromirror 70 depicted in cross section in FIG. 5(*a*) corresponds to the design used in FIGS. 2 to 4, in which a carrier 72 exhibits exactly one reflection area 74 that is tilted against the surface of the security element. The carrier 72 is typically formed by an embossed lacquer layer, and the reflection area 74 by an applied metal layer. According to the present invention, the tilt angle α is preferably between 0° and about 45° such that the angle 2α between the incident radiation 76 and the reflected radiation 78 is between 0° and about 90°. For example, the tilt angle α is about 35°.

The reflection area can be formed to be flat, as in FIG. 5(*a*) or, like the reflection area 80 in FIG. 5(*b*), also to be convexly curved in order to enlarge the solid angle range 82 from which the reflected radiation is perceptible. In addition, the reflection area can also be concavely curved, as in FIG. 5(*c*).

The reflectivity of the micromirrors can be adjusted within a broad range by the choice of the reflective coating. In particular, the brightness of the reflected radiation can be systematically influenced by matte patterns or other measures on the reflection area. For example, FIG. 5(*d*) shows a micromirror whose reflection area 84 is covered in a region 86 with a so-called moth-eye pattern, that is, with a pattern comprising "knobs" that effectively inhibit the reflection in the covered region 86. Here, the characteristic dimensions of the knobs are expediently between only a few nanometers to a few 100 nanometers. The reflectivity can be adjusted practically steplessly to a value between 0 and a certain maximum value in accordance with the share of the matte patterns or the moth-eye patterns in the total area of the reflection area 84. In this way, the micromirrors can depict any "gray values" within an image motif.

As shown in FIG. 5(*e*), also transparent, high-index layers 88 can be used as reflection layers such that a piece of information applied to the security element beneath the micromirrors, such as an imprint 90, remains visible.

Instead of a simple profile, the micromirrors can also exhibit a more complex relief shape having two or more reflection areas that are tilted in different directions against the surface of the security element, such as the roof form 92 shown in FIG. 5(*f*) or the multilateral pyramidal relief shape 94 shown in FIG. 5(*g*). It is understood that the reflection areas can be curved and/or altered in their reflection factor also in these more complex profile shapes.

To form a predefined motif from micromirrors as mosaic elements, in the simplest case, the procedure already described in connection with FIG. 2 can be used. However, according to the present invention, the micromirror mosaic can also reflect two or more different image motifs in different spatial regions such that a tilt or motion image is created for the viewer upon appropriate movement of the security element.

If, for instance, as indicated in FIG. 6(*a*), two image motifs 102 and 104 in a security element 100 are to be visible from different viewing directions, then the available image area 110 is broken down such that, to each of the individual motifs to be produced, sub-areas 112-1 and 112-2 are allocated in which the pixels 114-1 and 114-2 for this individual motif are disposed, see FIG. 6(*b*). Here, in at least one dimension, the sub-areas 112-1, 112-2 are executed having an expanse below the resolution limit of the eye, and thus to be not perceptible for the viewer as sub-areas without auxiliary means. Typically, at a maximum expanse of less than 300 μm, the sub-areas 112-1, 112-2 are formed to be strip-shaped (as in FIG. 6(*b*)) or rectangular. However, it is understood that also any other contour shapes may be used for the sub-areas.

Instead of a tilt image having two image motifs, the motif can also include a motion image comprising multiple sub-images 116 that, upon appropriate movement of the security element, become visible in succession and thus convey the illusion of a moving image motif, as indicated in FIG. 6(*c*). For this, analogously to the approach in FIG. 6(*b*), the entire image area is broken down into the corresponding number of sub-areas, each of which includes the pixels for one of the sub-images 116.

Further variants of such motifs composed of multiple sub-images are described in the publication WO 2005/038500 A1, whose disclosure in this respect is incorporated in the present application. In this publication are also mentioned respective advantageous divisions of the image area into sub-areas whereas, in transferring the divisions to the subject of the present application, the sub-areas are, of course, to be filled with a micromirror mosaic rather than with diffraction patterns.

The small size of the individual micromirrors permits a large number of variation possibilities for how the entire image area can be broken down into sub-areas, pixels and, ultimately, the micromirror mosaic. Since a pixel typically includes a large number of micromirrors, a further piece of information that is not accessible to the viewer without auxiliary means can be encoded especially in the specific arrangement of the micromirrors within the pixels. This further piece of information can thus be used as an additional security feature.

Two examples for the encoding of such additional pieces of information are depicted in FIGS. 7 and 8.

In the invention variant in FIG. 7, the micromirror elements are each disposed in the form of an array within a pixel whose area is somewhat larger than the total area of the micromirror array. Here, the further piece of information is encoded in the relative position of the micromirror array within the pixel, without this code having an impact on the appearance of the security element when viewed normally.

For illustration, two pixels 120 and 122 are shown in FIG. 7 having a 9×9 array of micromirrors 124 each. The micromirrors 124 each exhibit a base area of 10 μm×15 μm, and the size of the pixels 120, 122, at 115 μm×160 μm, exceeds the total size of the micromirror array in the x- and y-direction by 25 μm in each case.

The upper left corner of the pixels 120, 122 constitutes a reference point 126 for the evaluation of the position of the micromirror array. According to the present invention, the upper left corner of the micromirror array is now not located at the reference point 126, but rather is offset against this reference point by a certain value (Δx, Δy). As can be seen in FIG. 7, for pixel 120, for example, this offset is (Δx, Δy)=(10 μm, 10 μm), while for pixel 122, it is (Δx, Δy)=(15 μm, 10 μm). Two further kinds of pixels that are not depicted in the figure exhibit an offset of (Δx, Δy)=(10 μm, 15 μm) or of (Δx, Δy)=(15 μm, 15 μm). Through these four possible arrangements of the micromirror array within the pixels, an additional 2 bits per pixel can be encoded. In addition, the chosen magnitudes of the offset ensure that in no sequence of pixels do too-small spacings between the micromirrors occur that could lead to undesired diffraction effects.

A second example is illustrated in FIG. 8. There, in at least some of the pixels, individual micromirrors are made optically inactive. This can happen, for example, in that, within a group of micromirrors having a certain tilt angle, flat micromirrors (tilt angle 0) or micromirrors having another tilt angle are inserted into the surface relief. In other embodiments, the reflectivity of the optically inactive micromirrors is greatly reduced by, for example, matte patterns or moth-eye patterns.

While in pixels of a first kind 132, a number of randomly selected micromirrors 136 is made optically inactive, in pixels of the second kind 130, this happens in a regular shape 134, such as in the shape of the letter "P". Since the number of optically active micromirrors is the same in both pixels, they appear equally bright to the viewer. The micro-encoded piece of information 134 can be made visible only with the aid of suitable magnification devices.

In the exemplary embodiments described so far, it was implicitly understood that the achromatically reflective micropatterns are located on planar substrates. However, the embodiments according to the present invention can also be used to advantage for curved or flexible substrates, such as labels, securities or banknotes.

One application of a security element according to the present invention as a label 140, as may be used, for example, on bottles or cans for upscale foods, is shown in FIG. 9. The security element 140 includes a plurality of micromirrors that are disposed in the form of a crest 142. The micromirrors can exhibit a simple relief shape having a single reflection plane that is tilted against the surface of the label. In the exemplary embodiment, the characteristic parameters of the micromirrors are chosen such that, when the security element is illuminated from above and at an angle, all micromirrors of the crest 142 reflect the incident radiation vertically ahead. Here, since the radiation impinges on the label 140 at different angles of incidence, the micromirrors exhibit appropriately different tilt angles of their reflection area $\alpha=\alpha(\varphi)$ at different locations along the span. If one sways the bottle or can having the security element 140 back and forth in the hand, then the previously inconspicuous crest 142 flashes brightly in a certain position.

Depending on the shape of the curved area and the desired effect when the security element is viewed, it can be necessary to make, in addition to the tilt angle, also the tilt direction of the reflection plane locus dependent. It is understood that, also in these embodiments, two or more image motifs can be deflected in different spatial directions to produce a tilt image, a motion image or the like.

FIG. 10 shows a further exemplary embodiment of the present invention, in which a flexible document 150 is furnished with an optically variable security element having a "curve flip effect". Different image motifs 152, 154 or 156 appear depending on the curvature state of the document 150. For this, analogously to the embodiments described above, the entire image area of the security element is broken down into multiple, in the exemplary embodiment into three, sub-areas. The first sub-area is covered with pixels for the image motif 152 of the flat state of the document, as depicted in FIG. 10(*a*). The second sub-area is covered with pixels for the image motif 154 of a first curvature state of the document, shown in FIG. 10(*b*), in that the micromirrors of this sub-area are formed having appropriate locus-dependent tilt angles and/or tilt directions. Analogously, the third sub-area is covered with pixels for the image motif 156 of a second curvature state of the document, shown in FIG. 10(*c*). If the document is now curved and relaxed, for example between the thumb and fingers of one hand, the image impression of the security element changes from FIG. 10(*a*) to 10(*c*) and back.

In addition to the direct viewing of the security elements treated thus far, also embodiments may be used in which the viewer views, not the image area provided with micropatterns itself, but rather a collection screen of suitable geometry onto which the micropattern projects the desired image motif upon suitable illumination. For illustration, FIG. 11 shows a banknote 160 having an inventive security element having a micromirror array 162. Here, the micromirror array 162 is designed for projection onto a collection screen 164 that is disposed perpendicularly to the banknote 160. The characteristic parameters of the micromirrors 162 are thus chosen such that, upon vertical illumination 166, they project the prechosen motif undistorted onto such a collection screen 164.

In the design shown, the projected motif can also be perceived—even if more faintly or distorted—when a collection screen is somewhat displaced or tilted. In other embodiments, the micromirrors can also be so coordinated with each other that the reflected beams of spaced micromirrors intersect at certain points such that the motif encoded in the micromirror array 162 can be read out only with a collection screen of suitable geometry in a fixed, predefined spacing.

In a further design, also multiple, spatially non-contiguous micromirror arrays can be designed for the projection of a joint image motif on a collection screen. Here, depending on the arrangement of the individual micromirror arrays, the shielding or destruction of one of the micromirror arrays can lead to a homogeneous attenuation of the luminosity of the image motif, or some sub-areas of the projected image motif can completely disappear, while the others remain unchanged.

In further embodiments of the present invention, the mosaic elements of the achromatically reflective micropattern form retroreflectors having a cube-corner pattern, thus a relief shape 170 having three reflection areas 172 that stand substantially vertically on top of one another and facing one another, of which two are shown in the cross-sectional diagram in FIG. 12. Radiation 174 impinging from a certain solid angle range is reflected back in the direction of incidence by such retroreflective mosaic elements.

Each of the cube-corner elements exhibits an optical axis 176 that is given by the spatial diagonal of the associated cube. As illustrated in FIG. 13, the mechanism of multiple reflection on which the retroreflection effect is based fails when the angle of incidence $\beta$ to the optical axis 176 exceeds a certain threshold angle. In other words, retroreflection occurs only in a certain solid angle range $\delta\psi$ about the optical axis 176.

In the inventive security element 180 according to FIG. 14, this is exploited in that the pixels that belong to different motifs are filled with cube-corner elements whose optical axes are oriented differently in space. If, for example, two motifs are to be depicted, then the optical axis of the first cube-corner elements 184-1 in the first pixels 182-1 can be tilted at a certain angle $\theta$ against the vertical in a first spatial direction, while the optical axis of the second cube-corner elements 184-2 of the second pixels 182-2 is tilted at another angle and/or in another spatial direction. In the exemplary embodiment, the optical axis of the second cube-corner elements 184-2 is tilted at the same angle $\theta$ in the direction opposite the first spatial direction, as shown in FIG. 15. Dark pixels of both motifs can be formed by pixels without cube-corner elements or by mirror areas having matte patterns or moth-eye patterns.

Under these conditions, retroreflection of the first cube-corner elements 184-1 can be observed in a solid angle range 186-1 about the first spatial direction, and retroreflection of the second cube-corner elements 184-2 in a solid angle range 186-2 about the second spatial direction.

If the security element 180 is now viewed from a direction 190 that lies within both solid angle ranges 186-1 and 186-2, then, upon suitable illumination, i.e. when illuminated from a direction that matches the viewing direction, both the pixels 182-1 of the first motif and the pixels 182-2 of the second motif appear bright, since the condition for retroreflection is met for both kinds of cube-corner elements 184-1, 184-2. Thus, from this viewing direction, the two motifs cannot be perceived separately.

If, in contrast, the security element 180 is viewed from a direction 192 that lies within the solid angle range 186-1 but outside the solid angle range 186-2, then the pixels 182-1 of the first motif appear bright, and the pixels 182-2 of the second motif, in contrast, dark, since the condition for retroreflection is met only for the first cube-corner elements 184-1. In this case, the first motif stands out, and the second, dark motif is practically not visible against the background of the dark pixels.

If, conversely, the security element 180 is viewed from a direction 194 that lies within the solid angle range 186-2 but outside the solid angle range 186-1, then the pixels 182-2 of the second motif appear bright, and the pixels 182-1 of the first motif, in contrast, dark, since the condition for retroreflection is then met only for the second cube-corner elements 184-2. Thus, in this case, the second motif stands out, while the first, dark motif is practically not visible against the background of the dark pixels.

The invention claimed is:

1. An optically variable security element for securing valuable articles, comprising an achromatically reflective micropattern in the form of a mosaic comprising a plurality of achromatically reflective mosaic elements, each having a reflection area, that are characterized by the parameters size, contour shape, relief shape, reflectivity and spatial orientation, and that form at least one predefined motif image in that different groups of mosaic elements having different characteristic parameters reflect incident light in different spatial regions, and in which the mosaic elements exhibit a lateral dimension of less than 30 µm, characterized in that, as reflection layers, the mosaic elements exhibit opaque metal layers; the reflection area of at least some individual ones of the mosaic elements including a region covered with a pattern that inhibits the reflection in the region.

2. The security element according to claim 1, characterized in that the mosaic elements exhibit a lateral dimension of more than 3 µm.

3. The security element according to claim 1, characterized in that the mosaic elements exhibit a quadratic, rectangular, round, oval, honeycomb-shaped or polygonally delimited contour shape.

4. The security element according to claim 1, characterized in that in no direction is the lateral dimension of each of the mosaic elements more than five times a dimension of the respective mosaic element in any other lateral direction.

5. The security element according to claim 1, the pattern being a matte pattern or moth-eye pattern.

6. The security element according to claim 1, characterized in that the mosaic elements exhibit a relief shape having exactly one reflection area that is tilted against a surface of the security element.

7. The security element according to claim 6, characterized in that a tilt angle of the reflection area of the mosaic elements is less than 90°.

8. The security element according to claim 6, characterized in that the reflection area of the mosaic elements is flat.

9. The security element according to claim 6, characterized in that the reflection area of the mosaic elements is concavely or convexly curved.

10. The security element according to claim 1, characterized in that at least some individual ones of the mosaic elements exhibit a relief shape comprising two or more reflection areas that are tilted in different directions against a surface of the security element, the mosaic elements especially exhibiting a roof structure or a multilateral pyramidal structure.

11. The security element according to claim 10, characterized in that a tilt angle of the reflection areas of the mosaic elements is less than 90°.

12. The security element according to claim 10, characterized in that the reflection areas of the mosaic elements are flat.

13. The security element according to claim 10, characterized in that the reflection areas of the mosaic elements are concavely or convexly curved.

14. The security element according to claim 1, characterized in that the mosaic elements form retroreflectors.

15. The security element according to claim 14, characterized in that the mosaic elements exhibit a cube-corner structure having a relief shape composed of three reflection areas that stand substantially vertically on top of one another and facing one another.

16. The security element according to claim 15, characterized in that an optical axis of each mosaic element, defined by the three reflection areas, points in a prechosen direction.

17. The security element according to claim 1, characterized in that the mosaic constitutes a raster image composed of a plurality of pixels, each pixel being formed by one or more achromatically reflective mosaic elements.

18. The security element according to claim 17, characterized in that a brightness of the pixels of the raster image is determined by one or more of the parameters size, contour shape, relief shape, reflectivity and spatial orientation of the mosaic elements of the respective pixel.

19. The security element according to claim 17, characterized in that a brightness of the pixels of the raster image is determined by a number of mosaic elements having certain parameters size, contour shape, relief shape, reflectivity and spatial orientation in the respective pixel.

20. The security element according to claim 1, characterized in that a further piece of information is encoded in the plurality of achromatically reflective mosaic elements within a pixel.

21. The security element according to claim 1, characterized in that the mosaic reflects, as the at least one predefined motif image, two or more different image motifs in different spatial regions such that, upon movement of the security element, the two or more different image motifs form a tilt or motion image.

22. The security element according to claim 1, characterized in that the mosaic reflects, as the at least one predefined motif image, a growing or shrinking contour line of an image motif in different spatial regions such that, upon movement of the security element, the image motif forms a pump image.

23. The security element according to claim 1, characterized in that the mosaic reflects, as the at least one predefined motif image, at least two views of an image motif in different spatial regions such that, at a prechosen viewing distance, the image motif forms a stereo image of the image motif.

24. The security element according to claim 1, characterized in that the parameters size, contour shape, relief shape, reflectivity and spatial orientation of the mosaic elements are chosen such that, for a level orientation of the security element, one or all of the at least one predefined motif images are visible.

25. The security element according to claim 1, characterized in that the parameters size, contour shape, relief shape, reflectivity and spatial orientation of the mosaic elements are chosen such that one or all of the at least one predefined motif images appear only upon a prechosen deformation of the security element.

26. The security element according to claim 1, characterized in that the parameters size, contour shape, relief shape, reflectivity and spatial orientation of the mosaic elements are chosen such that, upon prechosen illumination, one or all of the at least one predefined motif images are projected onto a collection area of a prechosen geometry.

27. The security element according to claim 1, characterized in that the security element additionally exhibits pieces of information in the form of patterns, characters or codes that are formed by non-reflective regions within the mosaic.

28. The security element according to claim 1, characterized in that the achromatically reflective micropattern is combined with holographic or hologram diffraction patterns.

29. The security element according to claim 1, characterized in that the achromatically reflective micropattern is provided with further security features, such as incorporated magnetic substances, incorporated phosphorescent, fluorescent or other luminescent substances, specifically adjusted conductivity, especially by a specifically adjusted thickness of a metallic reflection layer, color-shift effects, and colored embossing lacquer.

30. The security element of claim 1 further comprising a transparent coating layer disposed atop the reflection layers.

31. An optically variable security element for securing valuable articles, comprising
- an achromatically reflective micropattern in the form of a mosaic comprising a plurality of achromatically reflective mosaic elements, each having a reflection area, that are characterized by the parameters size, contour shape, relief shape, reflectivity and spatial orientation, and that form at least one predefined motif image in that different groups of mosaic elements having different characteristic parameters reflect incident light in different spatial regions, and in which the mosaic elements exhibit a lateral dimension of less than 30 µm, characterized in that, as reflection layers, the mosaic elements exhibit transparent, high-refractive-index layers; and
- a piece of information applied to the security element beneath the achromatically reflective micropattern that is visible when viewing through the achromatically reflective micropattern.

32. The security element of claim 31, the reflection area of at least some individual ones of the mosaic elements including a region covered with a pattern that inhibits the reflection in the region.

33. An optically variable security element for securing valuable articles, comprising an achromatically reflective micropattern in the form of a mosaic comprising a plurality of achromatically reflective mosaic elements, each having a reflection area, that are characterized by the parameters size, contour shape, relief shape, reflectivity and spatial orientation, and that form at least one predefined motif image in that different groups of mosaic elements having different characteristic parameters reflect incident light in different spatial regions, and in which the mosaic elements exhibit a lateral dimension of less than 30 µm, characterized in that, as reflection layers, the mosaic elements exhibit thin-layer elements having a color-shift effect, the reflection area of at least some of individual ones of the mosaic elements including a region covered with a pattern that inhibits the reflection in the region.

34. The security element according to claim 33, characterized in that at least some individual ones of the mosaic elements exhibit a relief shape comprising two or more reflection areas that are tilted in different directions against a surface of the security element, the mosaic elements especially exhibiting a roof structure or a multilateral pyramidal structure.

35. An optically variable security element for securing valuable articles, comprising an achromatically reflective micropattern in the form of a mosaic comprising a plurality of achromatically reflective mosaic elements, each having a reflection area, that are characterized by the parameters size, contour shape, relief shape, reflectivity and spatial orientation, and that form at least one predefined motif image in that different groups of mosaic elements having different characteristic parameters reflect incident light in different spatial regions, and in which the mosaic elements exhibit a lateral dimension of less than 30 µm, characterized in that, as reflection layers, the mosaic elements exhibit layers composed of liquid crystal material, especially composed of cholesteric liquid crystal material; the reflection area of at least some of individual ones of the mosaic elements including a region covered with a pattern that inhibits the reflection in the region.

* * * * *